(12) United States Patent
Imai et al.

(10) Patent No.: US 12,384,206 B2
(45) Date of Patent: Aug. 12, 2025

(54) TIRE WEAR MEASURING DEVICE AND POWER GENERATING DEVICE

(71) Applicant: Alps Alpine Co., Ltd., Tokyo (JP)

(72) Inventors: Yuki Imai, Niigata-ken (JP); Tokuo Nakamura, Niigata-ken (JP); Takafumi Noguchi, Miyagi-ken (JP); Hiroyuki Tobari, Miyagi-ken (JP); Shinya Ichise, Miyagi-ken (JP); Ryosuke Suzuki, Miyagi-ken (JP); Rie Kurosawa, Niigata-ken (JP); Heishiro Fudo, Miyagi-ken (JP); Eiji Shinohara, Niigata-ken (JP); Manabu Tamura, Miyagi-ken (JP); Nobuhiko Suematsu, Tokyo (JP)

(73) Assignee: Alps Alpine Co., Ltd., Tokyo (JP)

( * ) Notice: Subject to any disclaimer, the term of this patent is extended or adjusted under 35 U.S.C. 154(b) by 214 days.

(21) Appl. No.: 18/159,350

(22) Filed: Jan. 25, 2023

(65) Prior Publication Data
US 2023/0158837 A1 May 25, 2023

Related U.S. Application Data

(63) Continuation of application No. PCT/JP2021/027841, filed on Jul. 28, 2021.

(30) Foreign Application Priority Data

Aug. 25, 2020 (JP) .................... 2020-141508

(51) Int. Cl.
*B60C 11/24* (2006.01)
*G01N 30/32* (2006.01)

(52) U.S. Cl.
CPC ............ *B60C 11/243* (2013.01); *G01N 30/32* (2013.01); *G01N 2030/324* (2013.01)

(58) Field of Classification Search
CPC ..... B60C 11/243; B60C 11/246; B60C 19/00; B60C 11/24; B60C 2019/005;
(Continued)

(56) References Cited

U.S. PATENT DOCUMENTS

| 10,103,361 B2 | 10/2018 | Takahashi et al. |
| 10,661,617 B2 | 5/2020 | Sekizawa et al. |

(Continued)

FOREIGN PATENT DOCUMENTS

| DE | 10 2008 028 967 | 2/2009 |
| JP | H05-302619 | 11/1993 |

(Continued)

OTHER PUBLICATIONS

International Search Report from International Application No. PCT/JP2021/027841 dated Oct. 19, 2021.
(Continued)

*Primary Examiner* — John E Breene
*Assistant Examiner* — Gedeon M Kidanu
(74) *Attorney, Agent, or Firm* — Beyer Law Group LLP

(57) ABSTRACT

A tire wear measuring device that detects wear of a tire based on a magnetic field from a magnetic object embedded in the tire includes magnetic sensors and a battery. The battery is capable of transmitting the magnetic field from the magnetic object, and has an outer edge from which the magnetic field from the magnetic object is emitted as an emission magnetic field. Each of the magnetic sensors is disposed in a position where the emission magnetic field is detectable by the sensor.

11 Claims, 13 Drawing Sheets

(58) Field of Classification Search
CPC ....... B60C 2011/0341; B60C 2019/004; B60C 23/041; B60C 23/0425; B60C 23/0433; B60C 23/064; G01B 7/00; G01B 7/26; G01B 7/06; G01B 7/10; H02K 7/18; G01M 17/02; G01N 2030/324; G01N 2030/8804; G01N 30/32; G01N 30/88; B60L 53/122

See application file for complete search history.

(56) References Cited

U.S. PATENT DOCUMENTS

| | | | |
|---|---|---|---|
| 2007/0035386 A1* | 2/2007 | Pullini | B60C 11/24 73/146 |
| 2009/0078347 A1* | 3/2009 | Niklas | B60C 11/246 73/146 |
| 2010/0276044 A1* | 11/2010 | Heise | G01B 7/26 73/146 |
| 2018/0370301 A1 | 12/2018 | Sekizawa et al. | |
| 2019/0359010 A1 | 11/2019 | Setokawa et al. | |
| 2020/0108576 A1* | 4/2020 | Setokawa | B29D 30/0662 |
| 2021/0370727 A1 | 12/2021 | Yamaguchi et al. | |
| 2022/0209582 A1* | 6/2022 | Fortes Montilla | H02J 50/60 |

FOREIGN PATENT DOCUMENTS

| | | |
|---|---|---|
| JP | H08-75403 | 3/1996 |
| JP | 2006-290315 | 10/2006 |
| JP | 2011-239510 | 11/2011 |
| JP | 2011239510 A * | 11/2011 |
| JP | 2017-114438 | 6/2017 |
| JP | 2019-64432 | 4/2019 |
| JP | 2019-203831 | 11/2019 |
| WO | WO 2017/122252 | 7/2017 |
| WO | 2020/070951 | 4/2020 |

OTHER PUBLICATIONS

Japanese Notice of Reasons for Refusal and English translation proposed on Jan. 24, 2024 from Japanese Application No. 2022-545565.

German Notice of Reasons of Refusal and English translation dated Oct. 1, 2024 from German Application No. 11 2021 004 471.0.

Japanese Notice of Reasons for Refusal and English translation proposed on Aug. 25, 2023 from Japanese Application No. 2022-545565.

* cited by examiner

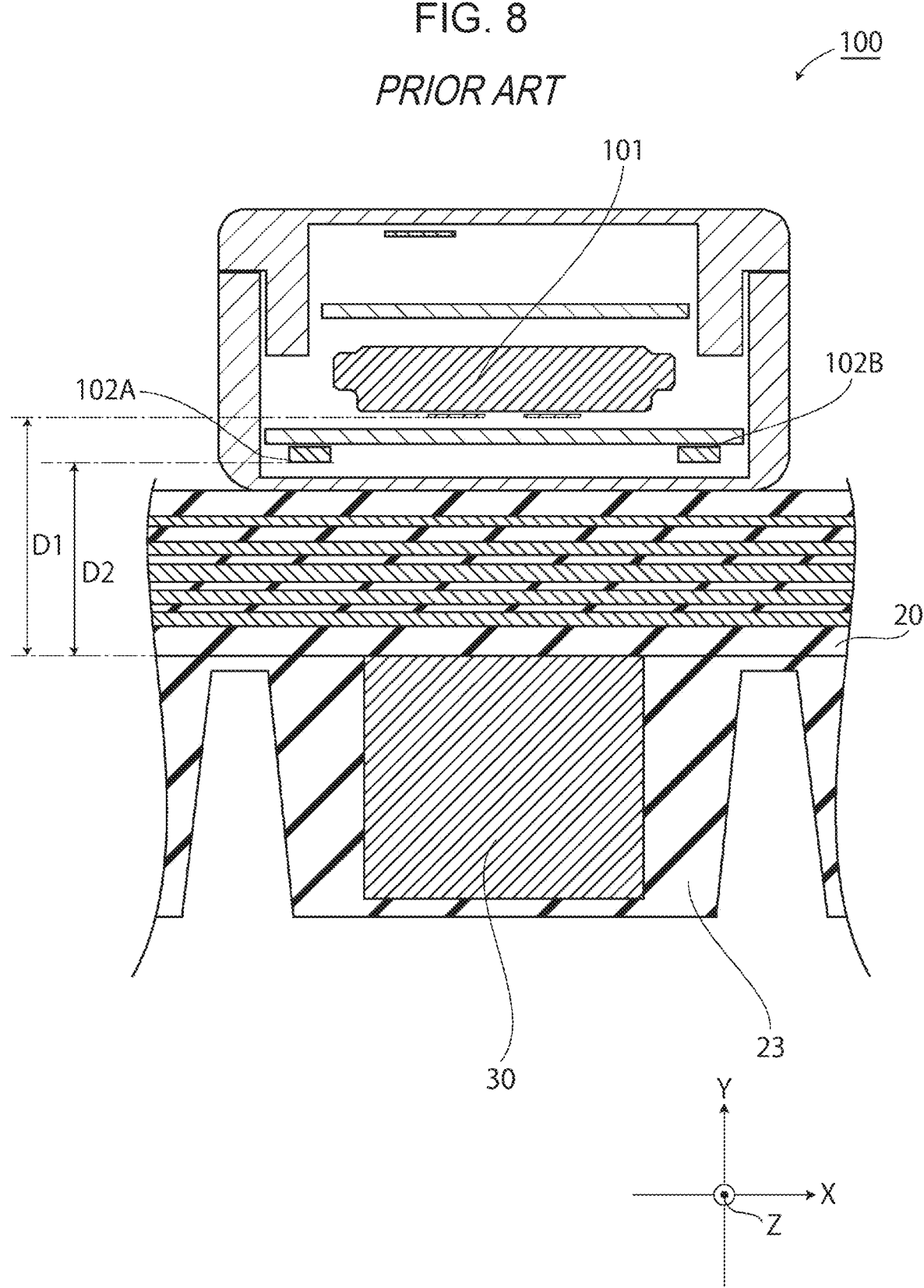

TIRE WEAR MEASURING DEVICE AND POWER GENERATING DEVICE

CLAIM OF PRIORITY

This application is a Continuation of International Application No. PCT/JP2021/027841 filed on Jul. 28, 2021, which claims benefit of Japanese Patent Application No. 2020-141508 filed on Aug. 25, 2020. The entire contents of each application noted above are hereby incorporated by reference.

BACKGROUND OF THE INVENTION

1. Field of the Invention

The present invention relates to a tire wear measuring device that detects wear of a tire based on a magnetic field from a magnet embedded in the tire and relates to a power generating device.

2. Description of the Related Art

The progression of wear of a tire reduces grip capability in traveling on a road and water discharge capability for discharging water between the tire and a road in traveling on a wet road. A driver or a fleet manager visually inspects treads of tires for wear and replaces a worn tire to ensure safety before the tire is excessively worn and unsafe for use. For example, slip signs provided in grooves on a tire are used for visual inspection. An inspection operation is complicated. A wear state may be wrongly determined. Some users may never perform inspection. If whether a tire is worn is wrongly determined, the tire having reduced capabilities may be continuously used, which is not preferable in terms of safety.

A sensor module has been developed to measure the degree of tire wear by using a method other than visual observation. For example, Japanese Unexamined Patent Application Publication No. 2019-203831 discloses a sensor module including a magnetic sensor that detects the magnetic flux density of a magnetic field in a direction along the radius of a tire in a tread portion. The sensor module is configured to measure wear of the tread portion based on the magnetic flux density detected by the magnetic sensor.

Japanese Unexamined Patent Application Publication No. 2011-239510 discloses an in-tire power generating device that supplies power to other devices in a tire. The power generating device includes rotary members each including a magnet, a base supporting the rotary members, and coils located in the base. The magnets rotate with rotation of a tire, thus generating electric power.

The sensor module disclosed in Japanese Unexamined Patent Application Publication No. 2019-203831 is intended to measure the strength of a magnetic field changing due to wear in order to always accurately determine a wear state of a tire. Accordingly, Japanese Unexamined Patent Application Publication No. 2019-203831 does not describe a configuration intended to reduce the size and weight of the sensor module. The sensor module is mounted on a tire in use. A large size or a heavy weight of the sensor module may cause the tire to be out of balance when rotating. Therefore, the sensor module is required to be as small and light as possible. The device disclosed in Japanese Unexamined Patent Application Publication No. 2011-239510, which is an elaborate power generating system, tends to increase in weight. A tire with such a device may be out of balance when rotating.

SUMMARY OF THE INVENTION

The present invention provides a tire wear measuring device that is capable of accurately detecting tire wear and achieves a reduction in size and weight and a power generating device that is mountable in a tire.

The present invention provides a tire wear measuring device that detects wear of a tire based on a magnetic field from a magnet embedded in the tire, the device including at least one magnetic sensor and a magnetic collecting member capable of transmitting the magnetic field from the magnet, the magnetic collecting member having an outer edge from which the magnetic field from the magnet is emitted as an emission magnetic field. The at least one magnetic sensor is disposed in a position where the emission magnetic field is detectable by the at least one magnetic sensor.

In the above configuration, the emission magnetic field from the magnetic collecting member is detected. Such a configuration eliminates the need for disposing the at least one magnetic sensor in proximity to the magnet embedded in the tire. This leads to higher flexibility in designing the at least one magnetic sensor. This allows simplification of a structure of the tire wear measuring device, resulting in a reduction in size and weight of the device and higher detection accuracy.

Preferably, the tire wear measuring device further includes a magnetic-field guiding member that guides the emission magnetic field. In this case, the magnetic collecting member may be a coin-type battery. Preferably, in plan view in a direction along a normal to an electrode surface of the coin-type battery, an end of the magnetic-field guiding member that is adjacent to the at least one magnetic sensor is disposed outside the outer edge of the coin-type battery, and the at least one magnetic sensor is disposed between the coin-type battery and the end of the magnetic-field guiding member.

Such a configuration allows the emission magnetic field guided by the magnetic-field guiding member to be efficiently detected by the at least one magnetic sensor, resulting in improved detection accuracy of the at least one magnetic sensor. Specifically, the emission magnetic field guided by the magnetic-field guiding member is formed between the coin-type battery and the end of the magnetic-field guiding member. The emission magnetic field guided by the magnetic-field guiding member allows an increase in magnetic flux density. Therefore, the at least one magnetic sensor disposed between the coin-type battery and the end of the magnetic-field guiding member can accurately detect the emission magnetic field.

Preferably, the electrode surface of the coin-type battery faces toward the magnet. Such a configuration allows the entire outer edge of the coin-type battery to emit the emission magnetic field. The at least one magnetic sensor disposed in proximity to the outer edge can detect the emission magnetic field.

The magnetic-field guiding member may be an antenna that serves as a waveguide and that emits and receives electromagnetic waves. The use of an antenna for communication as the magnetic-field guiding member enables a reduction in size and weight of the tire wear measuring device.

A direction in which the emission magnetic field is detectable by the at least one magnetic sensor may be parallel to the electrode surface of the coin-type battery. The end of the magnetic-field guiding member and the at least one magnetic sensor may be arranged on the same plane parallel to the electrode surface of the coin-type battery.

Such a configuration allows the emission magnetic field that is detected by the at least one magnetic sensor to contain more components parallel to the electrode surface of the coin-type battery, resulting in efficient detection of the emission magnetic field.

The at least one magnetic sensor may include a first sensor and a second sensor. The first sensor may be disposed at one side of the coin-type battery in a direction parallel to the electrode surface of the coin-type battery, and the second sensor may be disposed at the other side of the coin-type battery in the direction. Wear of the tire may be detected based on an output of the first sensor and an output of the second sensor.

In this case, preferably, in plan view in the direction along the normal to the electrode surface of the coin-type battery, the electrode surface of the coin-type battery has a center aligned with the magnet embedded in the tire and located on a straight line connecting the first sensor and the second sensor.

The outputs of the first and second sensors can be used to cancel out the influence of noise, such as an external magnetic field. A magnetic field at one side of the coin-type battery and a magnetic field at the other side thereof are oriented in opposite directions. For example, using the difference between the outputs provides an output whose magnitude is approximately two times the magnitude of an output of one magnetic sensor, leading to improved detection accuracy.

In the tire wear measuring device including a magnetic-field guiding member that guides the emission magnetic field, the at least one magnetic sensor may include a first sensor and a second sensor, the magnetic-field guiding member may have a first end and a second end that are adjacent to the at least one magnetic sensor, the magnetic collecting member may be a coin-type battery, the first sensor and the first end may be arranged at one side of the coin-type battery in a direction parallel to an electrode surface of the coin-type battery, and the second sensor and the second end may be arranged at the other side of the coin-type battery in the direction, and wear of the tire may be detected based on an output of the first sensor and an output of the second sensor.

Such a configuration allows the emission magnetic field guided by the magnetic-field guiding member to be efficiently detected by the at least one magnetic sensor, leading to improved accuracy of measurement of tire wear.

The tire wear measuring device may further include a coil disposed within a range of the magnetic field from the magnet, and an induction current that is generated in the coil due to rotation of the tire may be available as an operational power source. In this case, preferably, the coil is disposed between the magnetic collecting member and the magnet.

As a relative positional relationship between the magnet and the coil changes with rotation of the tire, the density of a magnetic flux passing through the coil changes. Disposing the coil between the magnetic collecting member and the magnet increases the density of the magnetic flux passing through the coil, leading to improved power generation efficiency. Therefore, while the tire wear measuring device is kept small in outer dimensions (size), electric power generated by the coil can be used for operation of the tire wear measuring device.

The present invention further provides a power generating device including a magnet embedded in a tire and a coil disposed within a range of a magnetic field from the magnet. In this device, a relative positional relationship between the magnet and the coil changes with rotation of the tire, and power is generated due to a change in density of a magnetic flux passing through the coil caused by a change of the relative positional relationship. Preferably, the power generating device further includes a magnetic collecting member, and the coil is disposed between the magnetic collecting member and the magnet.

Such a configuration enables an induction current that is generated due to a change in density of the magnetic flux passing through the coil caused by rotation of the tire to be used for power generation.

BRIEF DESCRIPTION OF THE DRAWINGS

FIG. 8 is a schematic cross-sectional view of the configuration of a related-art tire wear measuring device;

DESCRIPTION OF THE PREFERRED EMBODIMENTS

Embodiments of the present invention will be described below with reference to the drawings. The same components are designated by the same reference signs in the figures, and redundant description is omitted as appropriate.

Figure 7:
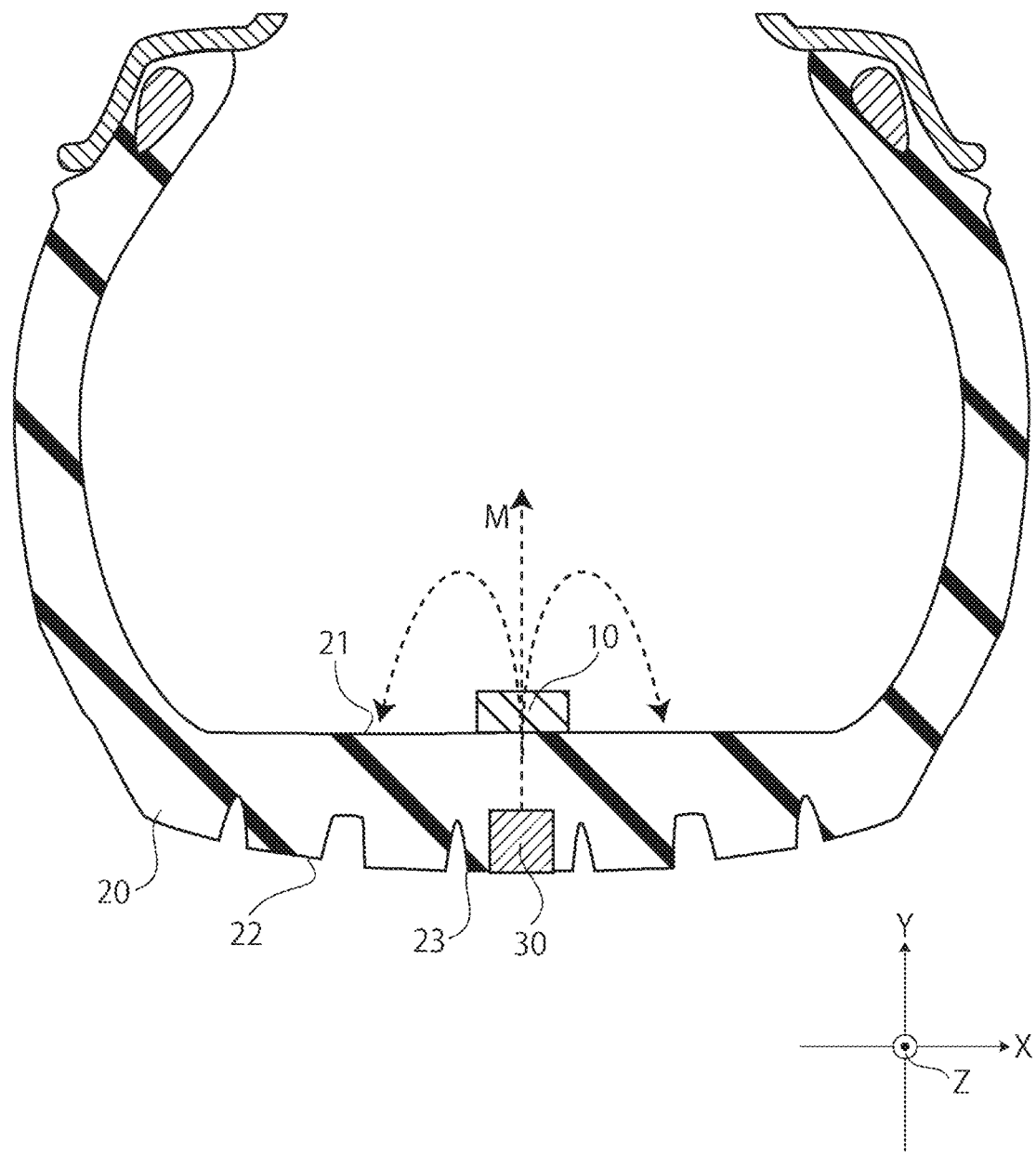
FIG. 7 is a schematic sectional view of the tire wear measuring device mounted on a tire.

FIG. 7 is a schematic cross-sectional view of a tire wear measuring device according to an embodiment of the present invention mounted on a tire. As illustrated in FIG. 7, a tire wear measuring device 10 is disposed on an inner surface 21 of a tire 20, and a magnetic object 30 is embedded in a tread portion 23 at an outer surface 22. As the magnetic object 30 wears down together with the tread portion 23, a magnetic field M, which is indicated by broken lines in FIG. 7, from the magnetic object 30 changes. The tire wear measuring device 10 can detect a wear state of the tread portion 23 by measuring the magnetic field M. For example, a wear state of the tire 20 can be measured based on a table previously storing changes of the magnetic field M associated with wear of the magnetic object 30 and a measured value of the magnetic field M.

FIG. 8 is a schematic cross-sectional view of the configuration of a related-art tire wear measuring device. As illustrated in FIG. 8, a tire wear measuring device 100 includes a coin-type battery 101. Because the coin-type battery 101 includes a package made of a high-permeability soft magnetic material, a magnetic field created by the magnetic object 30 embedded in the tread portion 23 of the tire 20 tends to be guided to the coin-type battery 101. For this reason, typically, the coin-type battery 101 is not disposed between the magnetic object 30 and magnetic sensors 102A and 102B. The magnetic sensors 102A and 102B are arranged closer to the magnetic object 30 than the coin-type battery 101, and are positioned sufficiently away from the coin-type battery 101. In other words, a distance D1 from the magnetic object 30 to the coin-type battery 101 is greater than a distance D2 from the magnetic object 30 to the magnetic sensors 102A and 102B so that the coin-type battery does not affect magnetic detection by the magnetic sensors 102A and 102B. Such arrangement of the coin-type battery 101 and the magnetic sensors 102A and 102B in FIG. 8 leads to a complicated structure of the tire wear measuring device 100, causing an increase in size of the device.

Figure 9A:
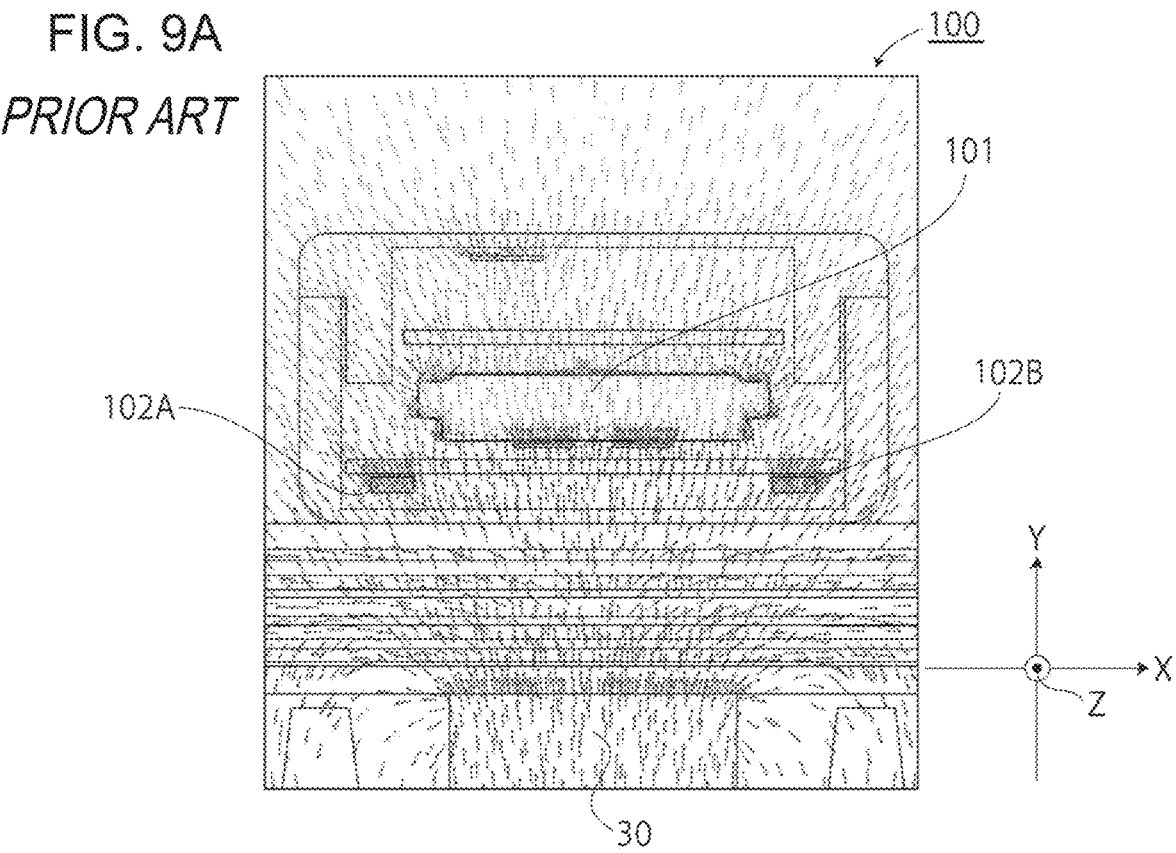
FIG. 9A is a vector map showing a magnetic field in the tire wear measuring device of FIG. 8.
Figure 9B:
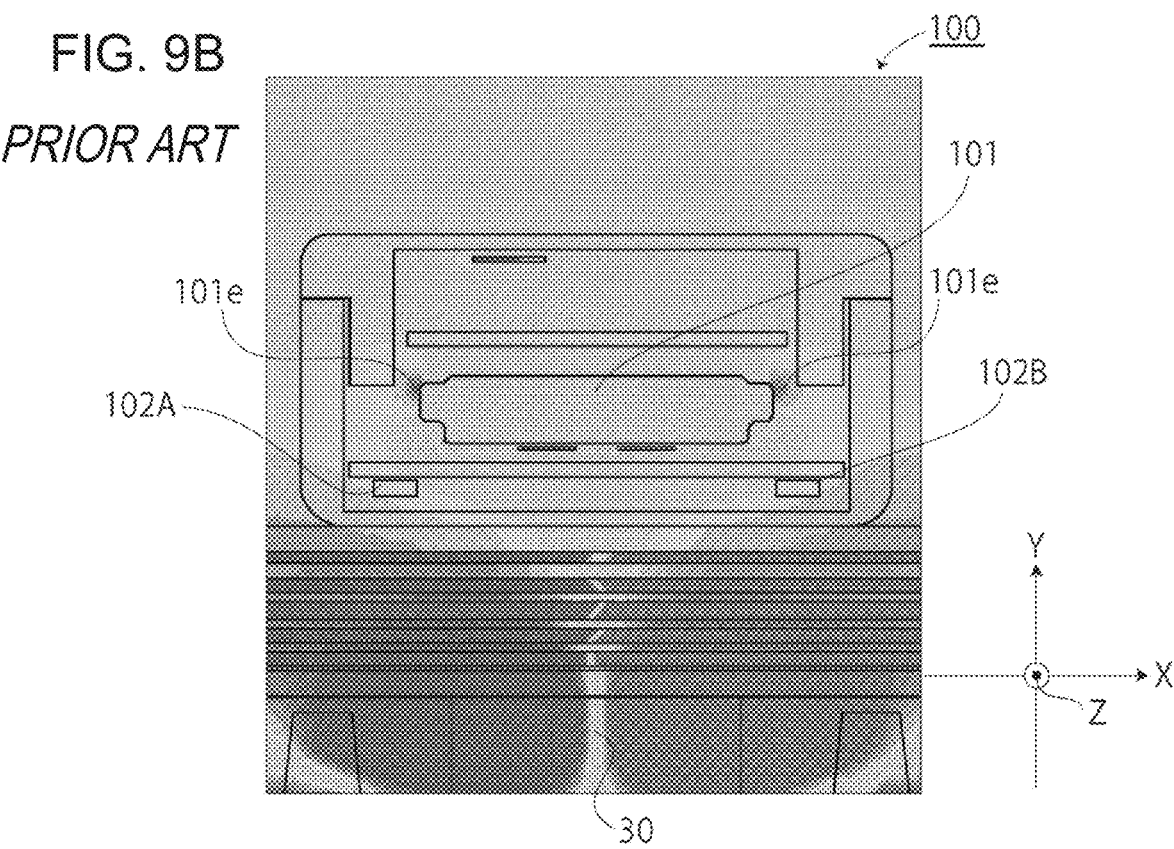
FIG. 9B is a contour map showing sensor-detectable components of the magnetic field in the tire wear measuring device of FIG. 8.

FIG. 9A is a vector map showing a magnetic field in the tire wear measuring device of FIG. 8. FIG. 9B is a contour map showing sensor-detectable components of the magnetic field in the tire wear measuring device of FIG. 8. The vector map shows the directions of magnetic field components and magnetic flux densities by using vectors. The contour map shows the magnetic flux densities of components of the magnetic field in a direction along the X axis as shades of gray. A darker shade of gray indicates a higher magnetic flux density.

As illustrated in FIG. 9A, in the related-art tire wear measuring device 100, a high-magnetic-flux-density region is formed near the magnetic object 30. The magnetic sensors 102A and 102B are arranged in this region to detect a magnetic flux from the magnetic object 30. However, it has been found that a region in which the magnetic flux density of the components in the direction along the X axis is high is formed in proximity to an outer edge 101e of the coin-type battery 101 opposite from the magnetic object 30, as illustrated in FIG. 9B. A magnetic field in this region is an emission magnetic field that is the magnetic field from the magnetic object 30 guided to the coin-type battery 101 and emitted through the coin-type battery 101. The emission magnetic field changes as the magnetic field from the magnetic object 30 changes. Therefore, measuring the emission magnetic field enables detection of a change in magnetic field from the magnetic object 30.

Specifically, the coin-type battery 101 can be disposed closer to the magnetic object 30 than the magnetic sensors 102A and 102B, and the magnetic sensors 102A and 102B can be arranged in a position where the emission magnetic field emitted from the outer edge 101e of the coin-type battery 101 is detectable by the sensors. Such a configuration enables measurement of a change in magnetic field from the magnetic object 30. This configuration allows the coin-type battery 101 to be used as a magnetic collecting member (pseudo yoke), resulting in a simplified structure of the tire wear measuring device 100. This enables a reduction in size and weight of the tire wear measuring device 100. Embodiments of the present invention will now be described.

Figure 1:
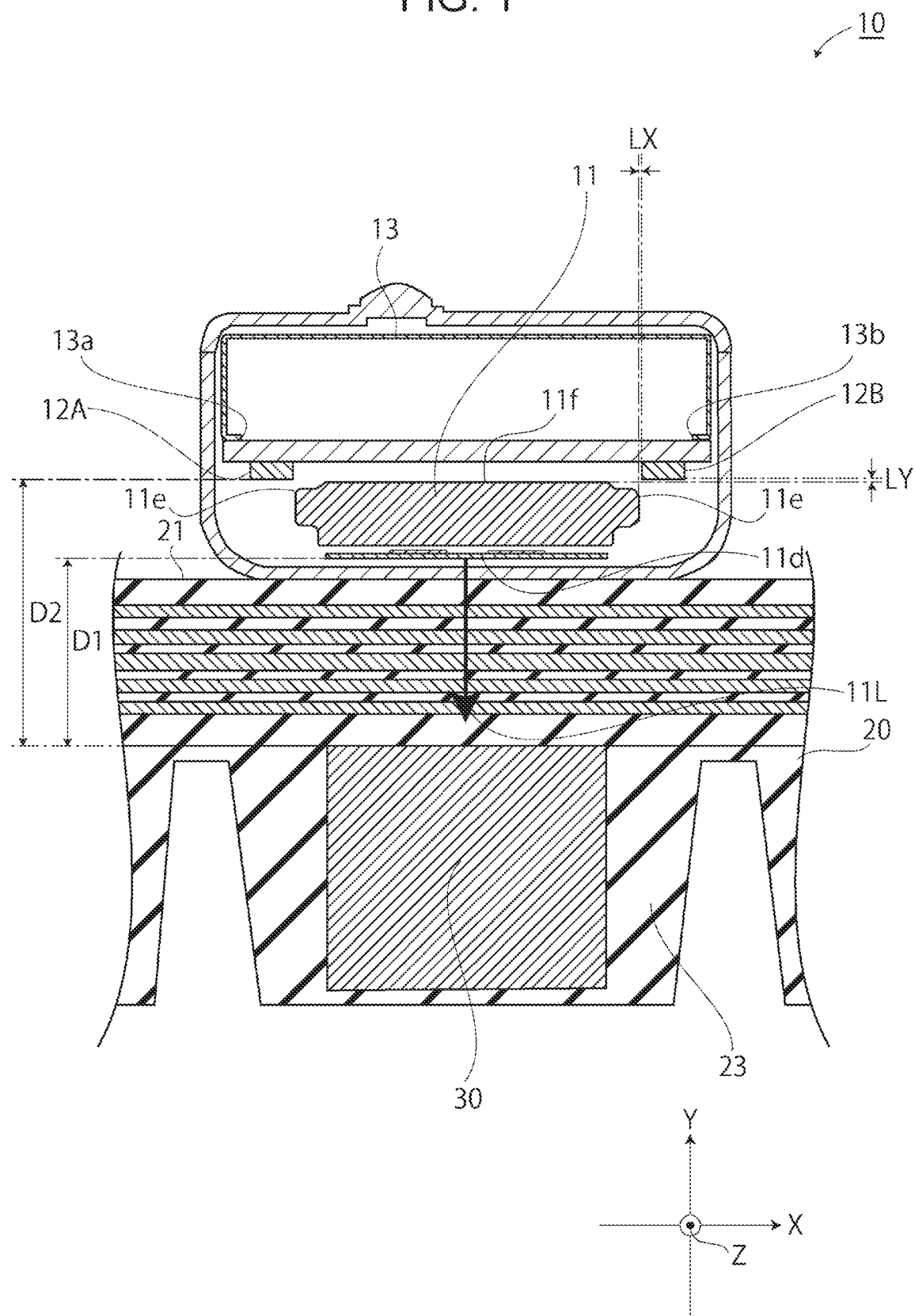
FIG. 1 is a schematic cross-sectional view of the configuration of a tire wear measuring device according to an embodiment of the present invention.

FIG. 1 a schematic cross-sectional view of the configuration of the tire wear measuring device according to the embodiment of the present invention. As illustrated in FIG. 1, the tire wear measuring device 10 according to the embodiment includes a magnetic sensor 12A, a magnetic sensor 12B, and a coin-type battery 11, and detects a magnetic field from the magnetic object 30 embedded in the tire 20 to measure wear of the tire 20.

The coin-type battery 11 is disposed in a position where the coin-type battery 11 can transmit the magnetic field from the magnetic object 30. The coin-type battery 11 has an outer edge 11e from which the magnetic field from the magnetic object 30 is emitted as an emission magnetic field. The embodiment will describe an example in which a commonly used coin-type (button-type) battery is used as a power source of the tire wear measuring device 10. A magnetic collecting member is not limited to the coin-type battery 11. Any magnetic collecting member capable of transmitting a magnetic field from the magnetic object 30 can be used. As used herein, the term "magnetic collecting member capable of transmitting a magnetic field" refers to a component, such as a battery, that allows a magnetic field from the magnetic object 30 to be emitted as an emission magnetic field therefrom and that includes a portion made of a high-permeability soft magnetic material. The coin-type battery 11 includes a package (exterior) continuously extending from an electrode surface 11d to the outer edge 11e, and the package is made of a soft magnetic material. When disposed in a position affected by the magnetic field from the magnetic object 30, the coin-type battery 11 transmits and allows the magnetic field from the magnetic object 30 to be emitted, as an emission magnetic field, from the outer edge 11e located remote from the magnetic object 30.

In this embodiment, the term "position affected by the magnetic field from the magnetic object 30" refers to a region where the magnetic flux density of the magnetic field from the magnetic object 30 is detectable. Although a magnetic flux density of more than 0 mT can be detected, a lower magnetic flux density is susceptible to noise. For example, it is preferred that the difference between multiple detection results be obtained to cancel out the influence of noise. As used herein, the term "being disposed in the position affected by the magnetic field from the magnetic object 30" refers to a state in which a magnetic-field transmitting portion made of a soft magnetic material is disposed in the position affected by the magnetic field. The coin-type battery 11 transmits and allows the magnetic field to be emitted, as the emission magnetic field, from the outer edge 11e as long as a portion of the electrode surface 11d that is made of the soft magnetic material is located in the position affected by the magnetic field. For this reason, the whole of the portion made of the soft magnetic material does not have to be disposed in the position affected by the magnetic field from the magnetic object 30.

The electrode surface 11d of the coin-type battery 11 may face toward the magnetic object 30. In other words, the electrode surface 11d is disposed to face toward the inner surface 21 of the tire 20 such that the direction (normal direction) of a normal 11L to the electrode surface 11d is along the Y axis. Thus, the coin-type battery 11 can efficiently transmit the magnetic field from the magnetic object 30 and allow the magnetic field to be emitted, as the emission magnetic field, from the outer edge 11e.

The magnetic sensors 12A and 12B are arranged in a position that is adjacent to a surface 11f of the coin-type battery 11 opposite from the magnetic object 30 and where the emission magnetic field emitted from the outer edge 11e is detectable by the sensors. The magnetic sensors 12A and 12B are arranged on the same plane. The emission magnetic field is emitted obliquely upward in FIG. 1 from the outer edge 11e. A region with a higher magnetic flux density than that of its surrounding region is formed in proximity to the outer edge 11e. In other words, arranging the magnetic sensors 12A and 12B in the position where the emission magnetic field emitted from the outer edge 11e is detectable enables accurate detection of a change in magnetic field. To detect the emission magnetic field through the magnetic sensors 12A and 12B, for example, a magnetic flux density in a direction in which the emission magnetic field is detectable in the position of each of the magnetic sensors 12A and 12B is preferably 0.4 mT or more. In this embodiment, the term "magnetic flux density" as used herein refers to a magnetic flux density that is detected when the tire wear measuring device 10 is mounted on a new tire 20 prior to use.

In the use of the magnetic object 30 generating a magnetic field with a surface magnetic flux density of, for example, 26 mT, if the coin-type battery 11 is disposed in a position where the distance D1 from the magnetic object 30 to the electrode surface 11d is in the range of approximately 10 to approximately 20 mm, the coin-type battery 11 can transmit the magnetic field. To accurately detect the emission magnetic field from the outer edge 11e through the magnetic sensors 12A and 12B, the magnetic sensors 12A and 12B are arranged such that a distance (LX) along the X axis from the outer edge 11e of the coin-type battery 11 is 2.8 mm or less, preferably 2.5 mm or less, more preferably 2.3 mm or less. For the same purpose, the magnetic sensors 12A and 12B are arranged such that a distance (LY) along the Y axis from the outer edge 11e of the coin-type battery 11 is 3.2 mm or less, preferably 2.9 mm or less, more preferably 2.7 mm or less.

As illustrated in FIG. 1, the distance D2 along the Y axis between the magnetic object 30 and the magnetic sensors 12A and 12B is greater than the distance D1 between the magnetic object 30 and the coin-type battery 11. Accordingly, the magnetic sensors 12A and 12B do not directly detect the magnetic field from the magnetic object 30. The magnetic sensors 12A and 12B detect the emission magnetic field transmitted through the coin-type battery 11 and emitted from the outer edge 11e. In the embodiment, the term "distance between components" as used herein refers to a distance between portions of the components that are closest to each other.

For the magnetic sensors 12A and 12B, which measure the emission magnetic field from the outer edge 11e, magnetoresistive elements each having a resistance that changes depending on the direction and strength of a magnetic field are used. Examples of the magnetoresistive element include a giant magnetoresistive (GMR) element and a tunneling magnetoresistive (TMR) element. Measurement by the magnetic sensors 12A and 12B does not have to be continuously performed in real-time, and may be intermittently performed at regular time intervals. Alternatively, measurement may be performed in response to an external instruction received through a radio communication unit (not illustrated). Measurement at regular time intervals or based on an instruction results in less power consumption than that in continuous measurement. Hall elements may be used to measure a change in strength of a magnetic flux, instead of the magnetoresistive elements as the magnetic sensors 12A and 12B. Magneto-impedance elements may be used as the magnetic sensors 12A and 12B to measure a change in impedance caused by a change in magnetic field.

The magnetic sensors 12A and 12B, which are configured to detect a magnetic flux density in the direction along the X axis, can accurately detect the emission magnetic field from the outer edge 11e. The detection direction is not limited only to the direction along the X axis. The magnetic sensors 12A and 12B may be configured to detect magnetic fields along three axes (i.e., the X axis, the Y axis, and the Z axis) orthogonal to each other. In this case, each of the magnetic sensors 12A and 12B may include three sensor elements each detecting a magnetic field along one axis. In the embodiment, the magnetic sensors 12A and 12B are GMR sensors each including a GMR element in a mold package.

The tire wear measuring device 10 may output information on wear of the tire 20 based on magnetic-field measurement by the magnetic sensors 12A and 12B to an in-vehicle device through, for example, the radio communication unit. The tire wear measuring device 10 can transmit information on measurement results of the magnetic sensors 12A and 12B to the in-vehicle device and receive information from the in-vehicle device through the radio communication unit. The transmission and reception of information through communication between the tire wear measuring device 10 and external devices is controlled by a central processing unit (CPU) (not illustrated).

The tire wear measuring device 10 may include an antenna 13 for external communication. The antenna 13 has opposite ends 13a and 13b positioned in proximity to the magnetic sensors 12A and 12B, respectively, such that each end is disposed in a position where the emission magnetic field from the outer edge 11e can be guided to the end. The antenna 13 may serve as a waveguide, and emit and receive electromagnetic waves. The antenna 13 functions as a magnetic-field guiding member (yoke) that guides the emission magnetic field from the outer edge 11e of the coin-type battery 11. The ends 13a and 13b of the antenna 13 are arranged in proximity to the outer edge 11e of the coin-type battery 11, and each function as a magnetic-field guiding member (yoke) that guides the emission magnetic field. The magnetic sensors 12A and 12B are arranged between the outer edge 11e and the ends 13a and 13b.

Figure 2A:
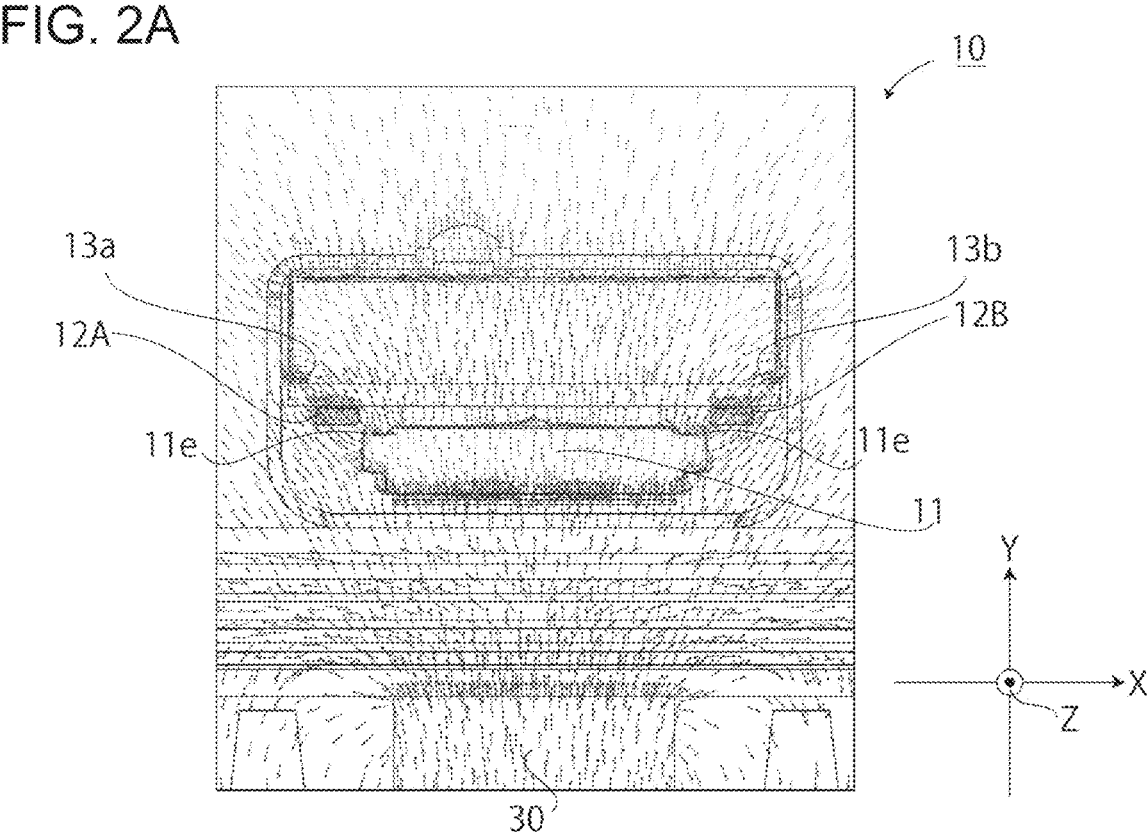
FIG. 2A is a vector map showing a magnetic field in the tire wear measuring device of FIG. 1.
Figure 2B:
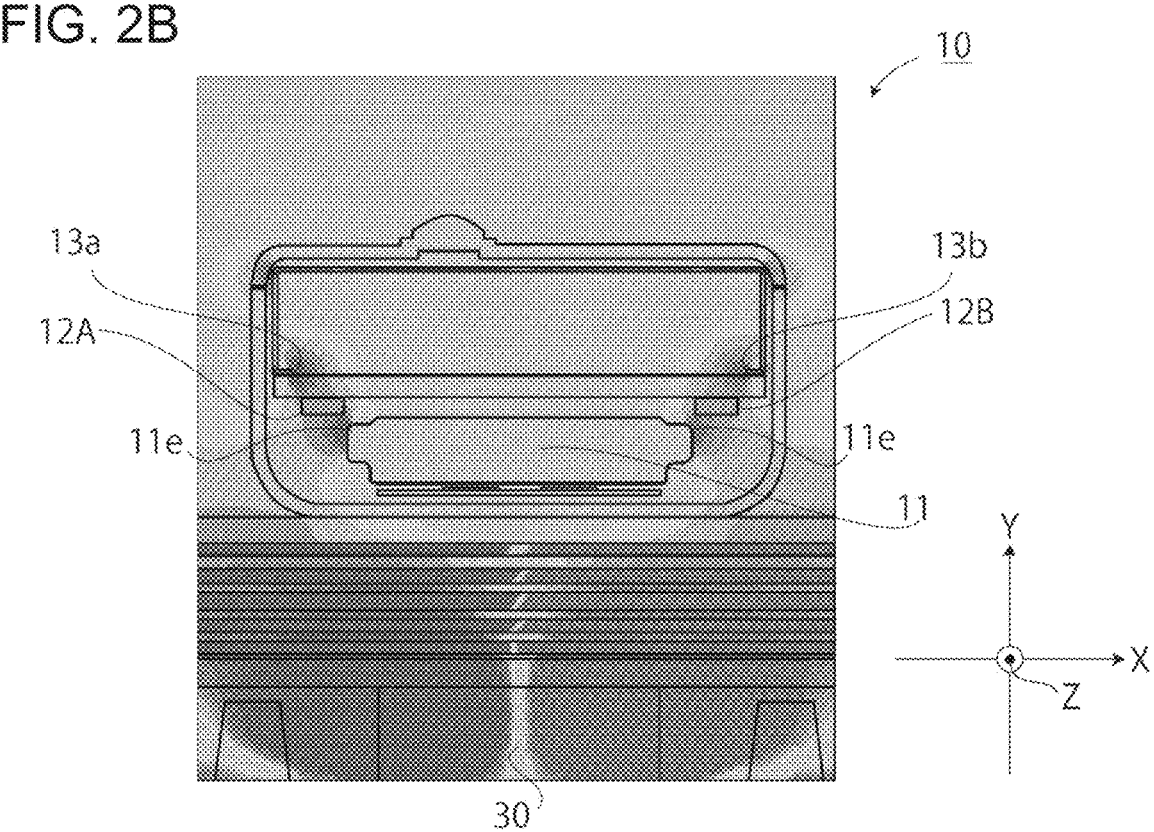
FIG. 2B is a contour map showing sensor-detectable components of the magnetic field in the tire wear measuring device of FIG. 1.

FIG. 2A is a vector map showing a magnetic field in the tire wear measuring device of FIG. 1. FIG. 2B is a contour map showing sensor-detectable components of the magnetic field in the tire wear measuring device of FIG. 1. As illustrated in FIGS. 2A and 2B, the tire wear measuring device 10 is configured such that the coin-type battery 11 is disposed in a position where the coin-type battery 11 can transmit the magnetic field from the magnetic object 30 and such that each of the magnetic sensors 12A and 12B is disposed in a position where the emission magnetic field from the outer edge 11e of the coin-type battery 11 is detectable by the sensor. Such a configuration allows the coin-type battery 11 to function as a pseudo yoke and also allows the magnetic sensors 12A and 12B to detect the emission magnetic field from the outer edge 11e. Disposing the coin-type battery 11 between the magnetic object 30 and the magnetic sensors 12A and 12B in the above-described manner enables a reduction in size and weight of the tire wear measuring device 10 and accurate measurement of a magnetic field from the magnetic object 30.

Figure 3A:
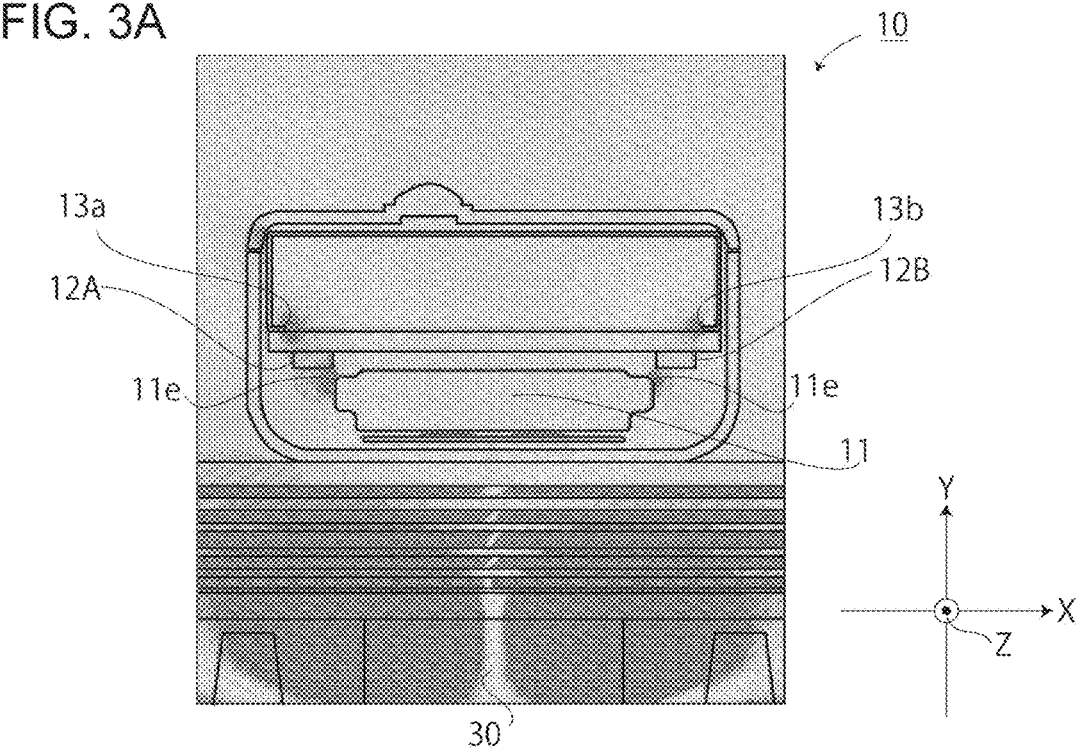
FIG. 3A is a contour map showing sensor-detectable components of the magnetic field in the tire wear measuring device of FIG. 1.
Figure 3B:
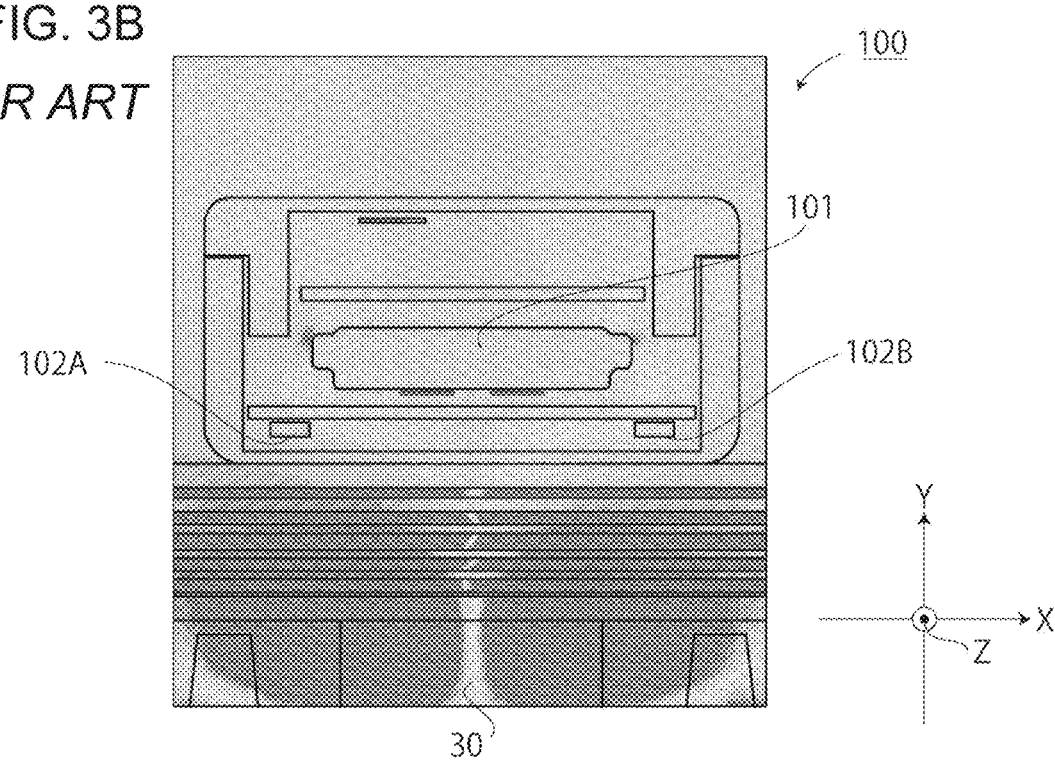
FIG. 3B is a contour map showing sensor-detectable components of a magnetic field in a tire wear measuring device of FIG. 8.

FIG. 3A is a contour map showing sensor-detectable components of the magnetic field in the tire wear measuring device of FIG. 1. FIG. 3B is a contour map showing sensor-detectable components of the magnetic field in the tire wear measuring device of FIG. 8.

As illustrated in FIG. 3A, in the tire wear measuring device 10 according to the embodiment, regions in which the magnetic flux density of components in the direction along the X axis is high are formed between the outer edge 11e of the coin-type battery 11 and the ends 13a and 13b of the antenna 13. These regions are formed by the emission magnetic field guided from the outer edge 11e of the coin-type battery 11 to the ends 13a and 13b of the antenna 13. The arrangement of the magnetic sensors 12A and 12B each having a sensitivity axis in the direction along the X axis in these regions enables accurate detection of the magnetic field from the magnetic object 30. Furthermore, since the magnetic sensors 12A and 12B are arranged between the outer edge 11e of the coin-type battery 11 and the ends 13a and 13b of the antenna 13, each of the magnetic sensors 12A and 12B is reliably disposed in a position where the emission magnetic field is detectable by the sensor.

As illustrated in FIG. 3B, in the related-art tire wear measuring device 100, the magnetic sensors 102A and 102B are arranged closer to the magnetic object 30 than the coin-type battery 11 and directly detect the magnetic field from the magnetic object 30. Such a configuration makes it difficult to reduce the size and weight of the measuring device.

Figure 4:
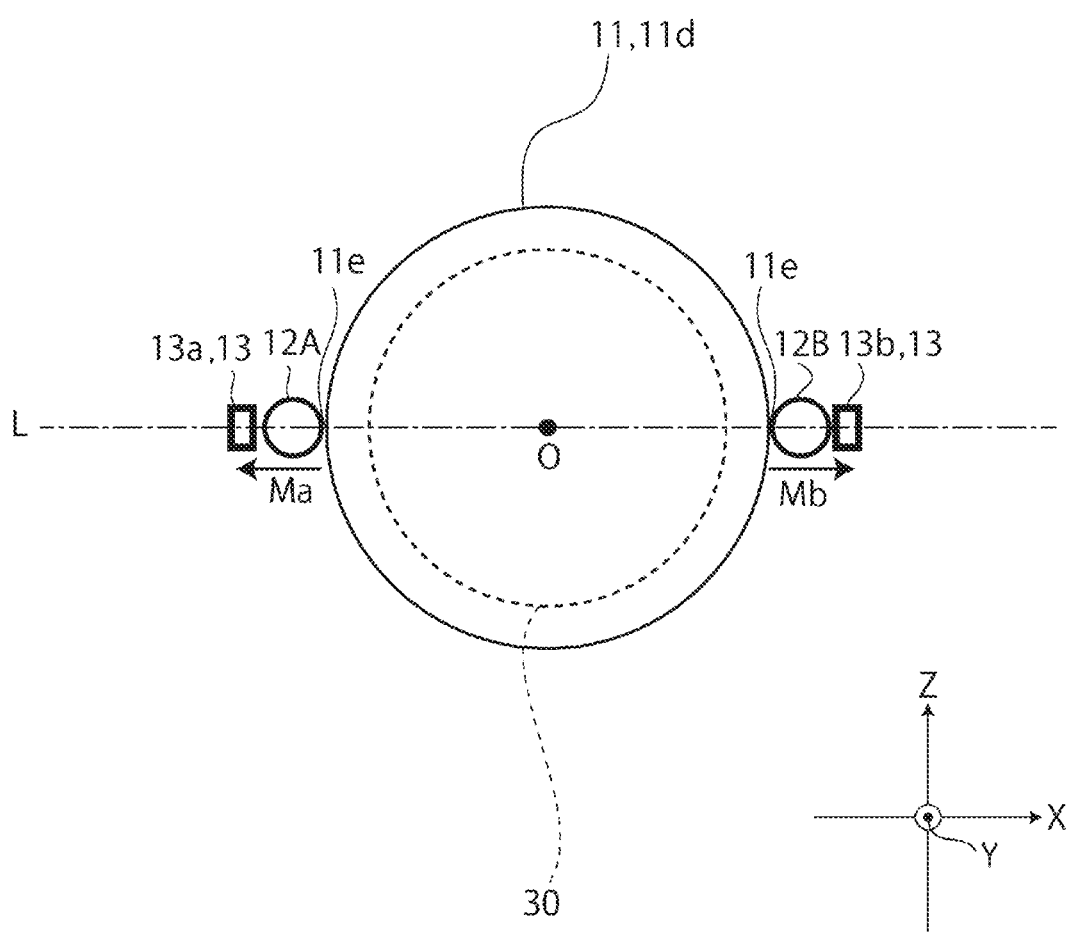
FIG. 4 is a schematic diagram illustrating the positional relationship between a magnet, a coin-type battery, magnetic sensors, and ends of an antenna in the tire wear measuring device of FIG. 1.

FIG. 4 is a schematic diagram illustrating the positional relationship between the magnetic object 30, the coin-type battery 11, the magnetic sensors 12A and 12B, and the ends 13a and 13b of the antenna 13 in the tire wear measuring device of FIG. 1. FIG. 4 schematically illustrates the positional relationship in plan view in the direction along the Y axis, or the direction along the normal 11L (refer to FIG. 1) to the electrode surface 11d of the coin-type battery 11. In other words, the electrode surface 11d faces away from the viewer of FIG. 4. As illustrated in FIG. 4, preferably, the end 13a of the antenna 13 adjacent to the magnetic sensor 12A and the end 13b thereof adjacent to the magnetic sensor 12B are arranged outside the outer edge 11e of the coin-type battery 11, or so as not to overlap the coin-type battery 11. Preferably, the magnetic sensor 12A is disposed between the outer edge 11e of the coin-type battery 11 and the end 13a of the antenna 13, and the magnetic sensor 12B is disposed between the outer edge 11e of the coin-type battery 11 and the end 13b of the antenna 13.

Referring to FIG. 4, in plan view in the direction along the Y axis, the outer edge 11e of the coin-type battery 11, the magnetic sensor 12A, and the end 13a of the antenna 13 are arranged so as not to overlap each other, and the outer edge 11e of the coin-type battery 11, the magnetic sensor 12B, and the end 13b of the antenna 13 are arranged so as not to overlap each other. The arrangement of FIG. 4 is an example. The magnetic sensors 12A and 12B only have to be arranged between the outer edge 11e of the coin-type battery 11 and the ends 13a and 13b of the antenna 13. For example, in plan view in the direction along the Y axis, the magnetic sensor 12A, the outer edge 11e, and a part or whole of the end 13a may overlap each other, and the magnetic sensor 12B, the outer edge 11e, and a part or whole of the end 13b may overlap each other.

The tire wear measuring device 10 may include the magnetic sensor 12A and the magnetic sensor 12B. The magnetic sensor 12A may be disposed at one side of the coin-type battery 11 in the direction along the X axis parallel to the electrode surface 11d of the coin-type battery 11, and the magnetic sensor 12B may be disposed at the other side thereof. In the embodiment, as illustrated in FIG. 4, the electrode surface 11d of the coin-type battery 11 may have a center O aligned with the magnetic object 30 embedded in the tire 20 and located on a straight line L connecting the magnetic sensor 12A and the magnetic sensor 12B.

The straight line L connecting the magnetic sensor 12A and the magnetic sensor 12B is parallel to the X axis. Each of the ends 13a and 13b of the antenna 13 is located on the straight line L. The magnetic sensors 12A and 12B are symmetrically arranged with respect to the center O of the electrode surface 11d of the coin-type battery 11. The ends 13a and 13b of the antenna 13 are symmetrically arranged with respect to the center O of the electrode surface 11d of the coin-type battery 11.

The magnetic sensor 12A and the end 13a may be arranged at one side of the coin-type battery 11, and the magnetic sensor 12B and the end 13b may be arranged at the other side thereof. The coin-type battery 11 is superposed on the magnetic object 30 as viewed in the direction along the Y axis.

The above-described configuration causes an emission magnetic field Ma detected by the magnetic sensor 12A and an emission magnetic field Mb detected by the magnetic sensor 12B to have the same magnetic flux density and be opposite in orientation to each other. Therefore, wear of the tire 20 can be detected based on an output of the magnetic sensor 12A and an output of the magnetic sensor 12B, resulting in improved redundancy of the tire wear measuring device 10.

The magnetic sensors 12A and 12B are similarly affected by an external magnetic field, serving as noise in measurement. For this reason, the difference between the outputs from these two sensors can be used to eliminate the influence of the external magnetic field. Since the outputs from the two sensors are based on the magnetic fields oriented in opposite directions, the use of the difference between the outputs provides an output whose magnitude is two times the magnitude of an output from one sensor in addition to elimination of the influence of noise. Therefore, the influence of noise, such as an external magnetic field, can be eliminated, and an output can be increased in magnitude, thus achieving accurate measurement of wear of the tire 20.

The magnetic object 30 includes a polymeric material and a hard magnetic particulate material (magnetic particles) dispersed in the polymeric material and magnetized in one direction. The magnetic object 30 is embedded in the tread portion such that the direction of magnetization is aligned with a radial direction of the tire. For the polymeric material, for example, a rubber material having the same formulation as that of a tread rubber composition for the tread portion is preferably used.

The magnetic object 30 preferably has a magnetic flux density of 1 mT or more at the surface thereof. In terms of achieving reliable measurement of the magnetic flux density of the magnetic object without being affected by the magnetism of the earth, the magnetic object 30 has a magnetic flux density of preferably 0.05 mT or more, more preferably 0.5 mT or more at measurement locations where the magnetic sensors 12A and 12B are arranged.

In terms of keeping a magnetic force from the magnetic object 30 from adversely affecting, for example, other in-vehicle electronic devices, the magnetic object 30 preferably has a surface magnetic flux density of 600 mT or less. In terms of keeping the magnetic object 30 from attracting a piece of metal, such as a nail, on a road in traveling on the road, the magnetic object 30 more preferably has a surface magnetic flux density of 60 mT or less. The surface magnetic flux density of the magnetic object is a value measured by a tesla meter in direct contact with the magnetized magnetic object 30.

<Modification>

Figure 5:
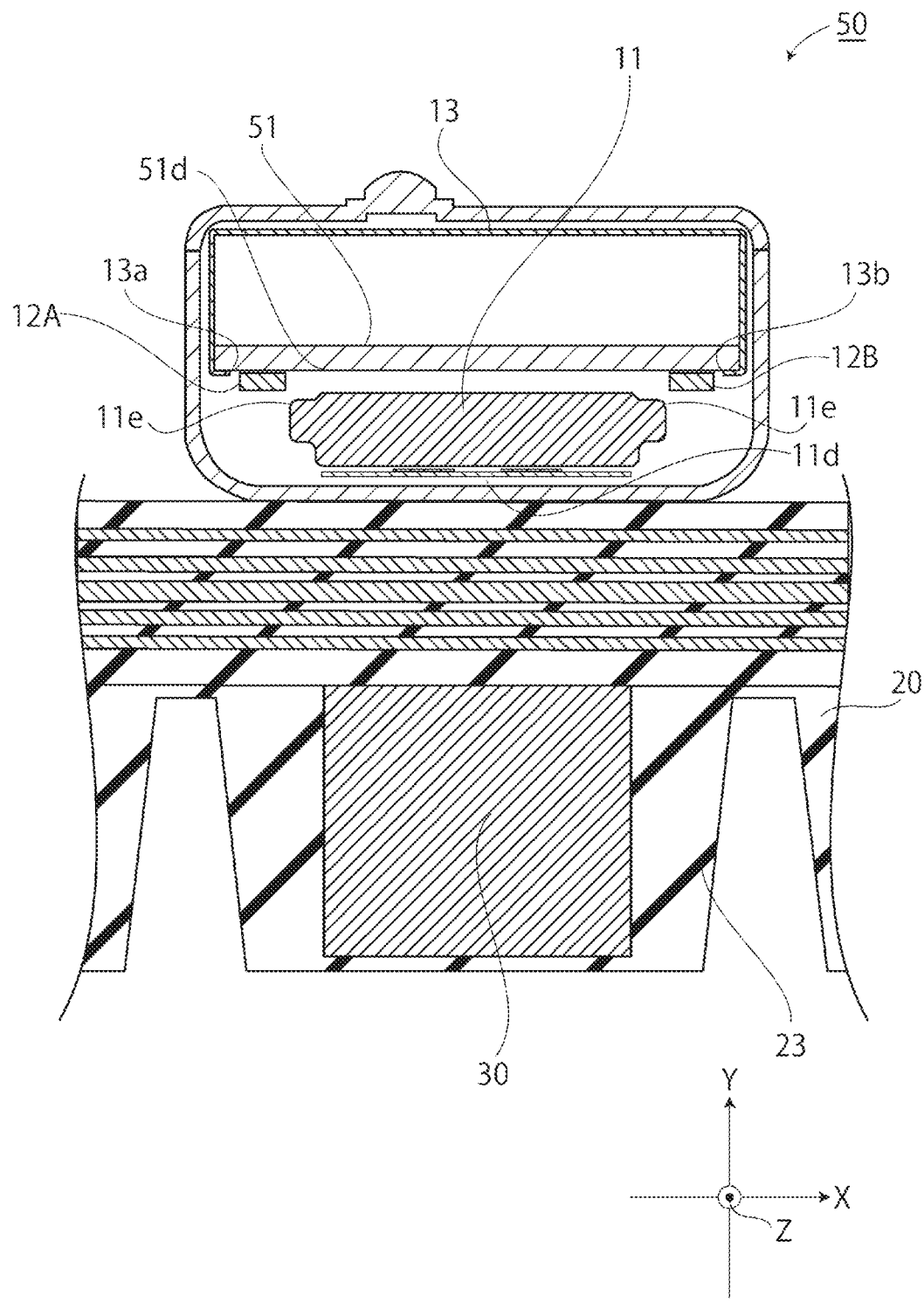
FIG. 5 is a schematic cross-sectional view of the configuration of a modification of the tire wear measuring device.

FIG. 5 is a schematic cross-sectional view of the configuration of a modification of the tire wear measuring device according to the embodiment. A tire wear measuring device 50 of FIG. 5 is configured such that the magnetic sensors 12A and 12B and the ends 13a and 13b of the antenna 13 are arranged on a surface 51d, which faces the coin-type battery 11, of a substrate 51. The tire wear measuring device 50 differs from the tire wear measuring device 10 in the above-described configuration. In other words, the tire wear measuring device 50 includes the magnetic sensors 12A and 12B and the ends 13a and 13b of the antenna 13 located on the same plane of the substrate 51 parallel to the electrode surface 11d of the coin-type battery 11.

Figure 6A:
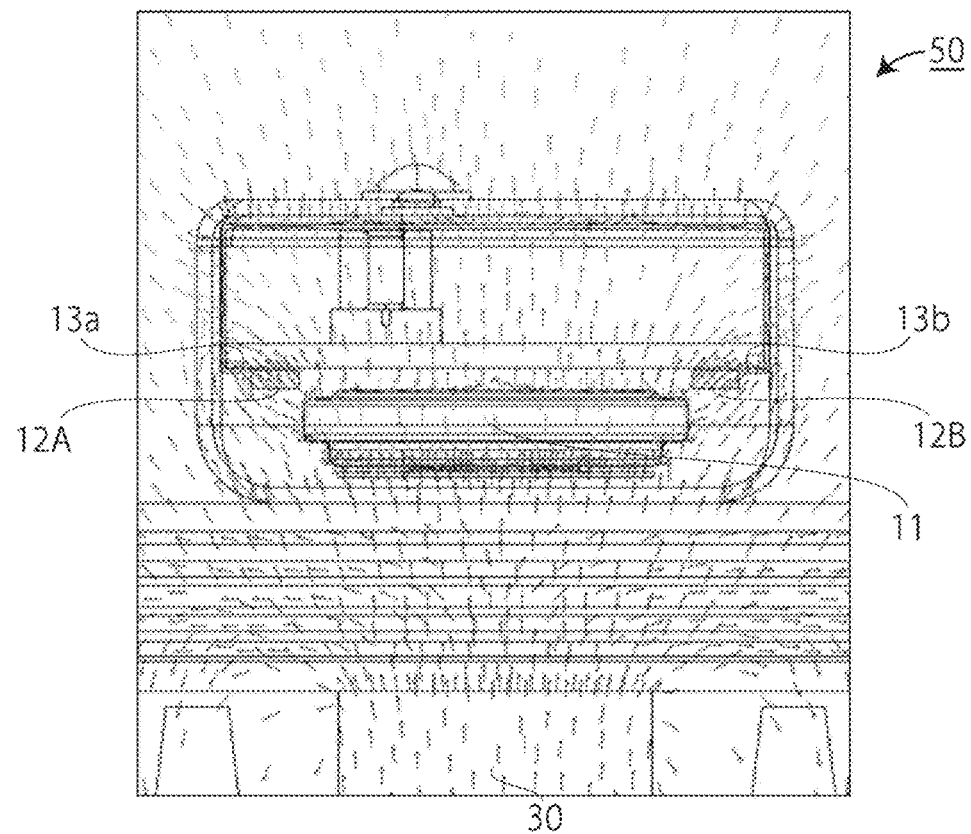
FIG. 6A is a vector map showing a magnetic field in a tire wear measuring device of FIG. 5.
Figure 6B:
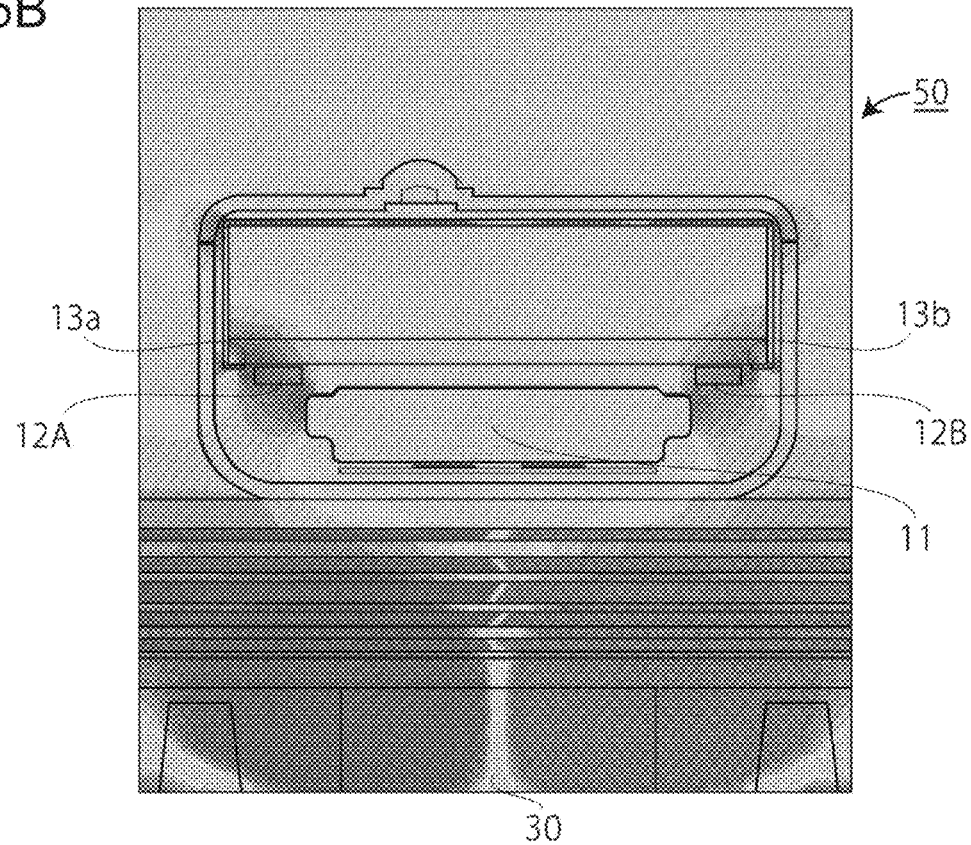
FIG. 6B is a contour map showing sensor-detectable components of the magnetic field in the tire wear measuring device of FIG. 5.

FIG. 6A is a vector map showing a magnetic field in the tire wear measuring device of FIG. 5. FIG. 6B is a contour map showing sensor-detectable components of the magnetic field in the tire wear measuring device of FIG. 5. As illustrated in FIGS. 6A and 6B, such a configuration, in which the magnetic sensors 12A and 12B and the ends 13a and 13b of the antenna 13 are located on the same plane, allows an emission magnetic field from the outer edge 11e of the coin-type battery 11 to be guided to the ends 13a and 13b of the antenna 13 and be oriented in the direction along the X axis in which the emission magnetic field is detectable by the magnetic sensors 12A and 12B on the substrate 51. This leads to higher detection accuracy of the tire wear measuring device 50.

Figure 10:
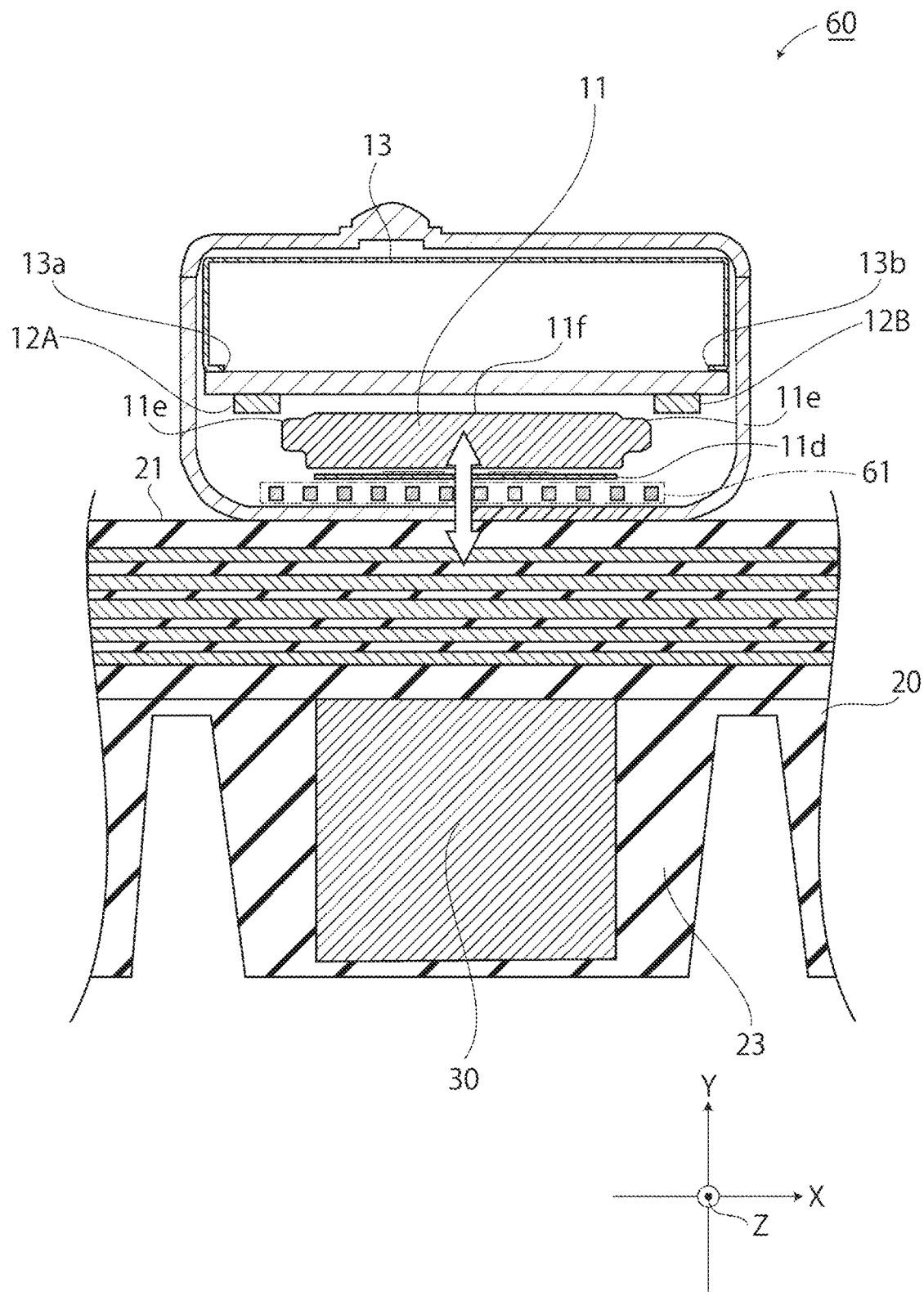
FIG. 10 is a schematic cross-sectional view of the configuration of another modification of the tire wear measuring device.

FIG. 10 is a schematic cross-sectional view of the configuration of another modification of the tire wear measuring device according to the embodiment. As illustrated in FIG. 10, a tire wear measuring device 60 includes a coil 61 disposed within the range of a magnetic field from the magnetic object 30 and can use, as an operational power source, an induction current generated in the coil 61 by rotation of the tire 20. The tire wear measuring device 60 differs from the tire wear measuring device 10 (refer to FIG. 1) in the above-described configuration. The magnetic object 30 embedded in the tread portion 23 of the tire 20 is displaced due to deformation of the tire 20 associated with its rotation. The tire wear measuring device 60 uses the displacement of the magnetic object 30 for electric power generation.

The coil 61 may be disposed between the coin-type battery 11, which also functions as a magnetic collecting member, and the magnetic object 30 embedded in the tread portion 23 of the tire 20. The magnetic flux density of a magnetic field from the magnetic object 30 passing through the coil 61 changes due to deformation or vibration of the tire 20 associated with rotation of the tire 20. A change in magnetic flux density in the direction along the Y axis, indicated by an outlined double-headed arrow in FIG. 10, causes an induction current in the coil 61, which in turn produces an electromotive force. The electromotive force is used as a power source of the tire wear measuring device 60 for, for example, activation of the tire wear measuring device 60 or communication.

In the tire wear measuring device 60, a change in magnetic flux density of the magnetic field from the magnetic object 30 associated with rotation or vibration of the tire 20 is used to generate an induction current in the coil 61, thus generating electric power. Therefore, the tire wear measuring device 60 can be kept small and lightweight, and generated electric power can be used for various applications. As described above, a change of the relative positional relationship between the magnetic object 30 and the coil 61 caused by rotation of the tire 20 is converted into and used as electrical energy. This reduces a power consumption burden on the coin-type battery 11.

For a magnetic field between the magnetic object 30 and the coin-type battery 11, the surface of the coin-type battery 11 collects the magnetic field, thus increasing the magnetic flux density of components in the direction along the Y axis of the magnetic field. For a typical magnetic flux passing through a coil, as the magnetic flux density of components (components in the direction along the Y axis in FIG. 10) of the magnetic flux that are orthogonal to the coil is higher, the magnetic flux through the coil changes more significantly, so that a larger induction current is generated in the coil. For this reason, when viewed from the magnetic object 30, the coil 61 is disposed adjacent to the coin-type battery 11 and is positioned closer to the magnetic object 30 than the coin-type battery 11. This increases an induction current that is generated in the coil 61 with rotation of the tire 20, thus enabling efficient electric power generation.

An electromotive force produced in the coil 61 changes depending on the magnitude of or degree of change in the magnetic flux density of a magnetic field from the magnetic object 30. In other words, an electromotive force produced in the coil 61 reflects a state of the tire 20. For this reason, an electromotive force produced in the coil 61 may be used to detect a state of the tire 20. For example, as the magnetic object 30 embedded in the tread portion 23 decreases in size due to wear of the tire 20, the magnetic flux density of the magnetic field from the magnetic object 30 decreases, so that a change in magnetic flux density of the magnetic field from the magnetic object 30 associated with rotation of the tire 20 also decreases. Therefore, an electromotive force (induction current) produced in the coil 61 changes depending on the degree of wear of the tire 20. For this reason, wear of the tire 20 can be detected based on an electromotive force produced in the coil 61. In this case, the tire wear measuring device 60 may exclude the magnetic sensors 12A and 12B in FIG. 10.

The coil 61 is electrically connected to a power-storing component (not illustrated). The power-storing component includes a rectifying circuit and a charging circuit, and allows an induction current generated due to a change in magnetic flux density to be charged in a capacitor. For the rectifying circuit, for example, a rectifying element including a circuit that rectifies an induction current (alternating current) generated in the coil 61 can be used. For the charging circuit, for example, a capacitive capacitor that stores electric charge of an induction current can be used. Using electric power stored in the capacitor for activation of the tire wear measuring device 60 or communication reduces the burden on the coin-type battery 11, thus extending a period (service life) during which the tire wear measuring device 60 can be continuously used. If the coin-type battery 11 is a secondary battery, the coin-type battery 11 may be used as a power-storing component, and the above-described capacitor may be omitted. In this case, the power-storing component includes a charging and discharging circuit instead of the charging circuit.

FIG. 10 illustrates an exemplary configuration in which the magnetic object 30 deforms as the tire 20 deforms. The configuration is not limited to this example. The tire wear measuring device 60 may have any configuration as long as deformation of the tire 20 causes a change in magnetic flux density of a magnetic field from the magnetic object 30 in the coil 61. For example, the tire wear measuring device 60 may have a configuration in which deformation of the tire 20 causes not the magnetic object 30 but the coil 61 to be deformed to cause a change in magnetic flux density of the magnetic field from the magnetic object 30 in the coil 61.

Figure 11:
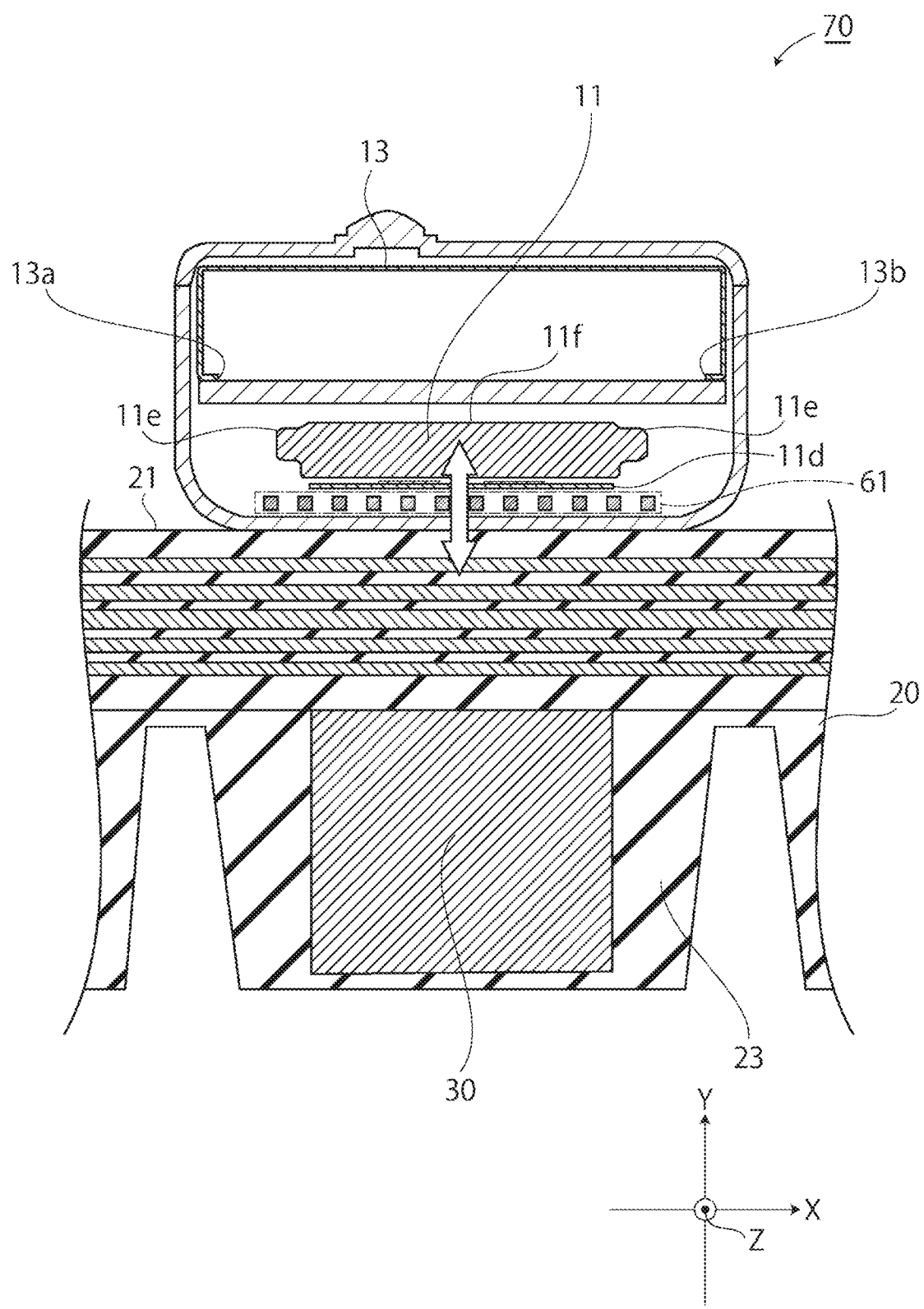
FIG. 11 is a schematic cross-sectional view of the configuration of a power generating device according to an embodiment of the present invention.

FIG. 11 is a schematic cross-sectional view of the configuration of a power generating device according to an embodiment of the present invention. As illustrated in FIG. 11, a power generating device 70 includes the magnetic object 30 embedded in the tire 20 and the coil 61 disposed within the range of a magnetic field from the magnetic object 30. A relative positional relationship between the magnetic object 30 and the coil 61 changes with rotation of the tire 20. A change of the relative positional relationship causes a change in magnetic flux density of the magnetic field passing through the coil 61, thus generating electric power.

The power generating device 70 further includes the coin-type battery 11 of a secondary battery type, serving as a magnetic collecting member. The coil 61 is disposed between the coin-type battery 11 and the magnetic object 30. Such a configuration can increase an induction current that is generated in the coil 61 with rotation of the tire 20, resulting in efficient power generation.

Although the antenna 13 is illustrated in FIG. 11, the antenna 13 may be removed from the configuration if it is not required. For example, the power generating device 70 may supply power to a sensor separate from the power generating device 70, and the sensor may have an antenna for communication.

The above-described embodiments are intended for easy understanding of the present invention and are not intended to limit the scope of the present invention. Therefore, the components disclosed in the above embodiments are intended to be construed as including all design changes and equivalents belonging to the technical scope of the present invention. For example, the power generating device 70 of FIG. 11 may include a measurement unit that measures a change in amplitude or frequency of an electromotive force produced in the coil 61 and may detect a tire state including a wear state based on a signal obtained by the measurement unit. If an electromotive force produced in the coil 61 is a signal source to be measured by the measurement unit, the power generating device 70 may serve as a detection device that outputs information on a tire state. Although the coin-type battery 11 functions as a magnetic collecting member in the power generating device 70, another magnetic collecting member different from the coin-type battery 11 may be provided. If the power generating device 70 functions as a detection device, the coin-type battery 11 may be excluded.

EXAMPLES

To determine how much an output in the tire wear measuring device 10 according to the embodiment having the configuration illustrated in FIG. 1 and an output in the tire wear measuring device excluding the antenna 13 are higher than that in the related-art tire wear measuring device 100 of FIG. 8, the outputs were measured and compared. The devices each included the magnetic object 30 having a surface magnetic flux density of 26 mT.

Figure 12A:
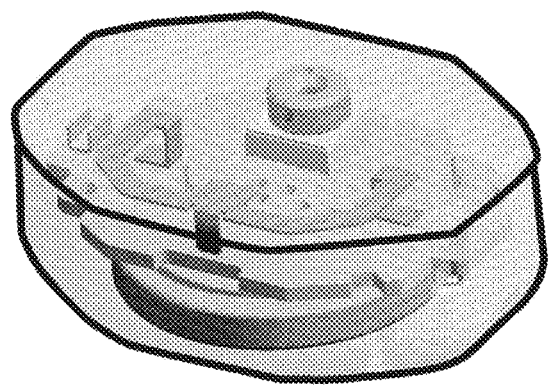
FIG. 12A is a perspective view illustrating the geometry of tire wear measuring devices of Example 1 and Example 2.
Figure 12B:
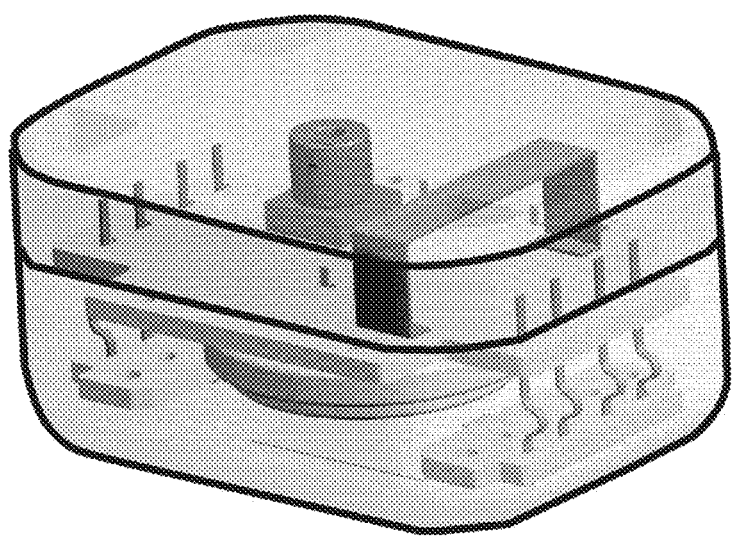
FIG. 12B is a perspective view illustrating the geometry of a tire wear measuring device of Comparative Example 1.

FIG. 12A is a perspective view illustrating the appearance and schematic internal structure of tire wear measuring devices of Example 1 and Example 2. FIG. 12B is a perspective view illustrating the appearance and schematic internal structure of a tire wear measuring device of Comparative Example 1. Table 1 and FIG. 13 illustrate the measured outputs.

TABLE 1

|  | Example 1 without yoke | Example 2 with yoke | Comparative Example 1 |
|---|---|---|---|
| D1 (mm) | 16.0 | 16.0 | 20.7 |
| D2 (mm) | 21.2 | 21.2 | 17 |
| Size (mm) | 28 × 36 × 15 | 28 × 36 × 15 | 36 × 47 × 24 |
| Volume Ratio (%) | 37.2 | 37.2 | 100.0 |
| Weight (g) | 21 | 21 | 42 |
| Weight Ratio (%) | 50.0 | 50.0 | 100.0 |
| Output Ratio (%) | 123.0 | 145.7 | 100.0 |

Figure 13:
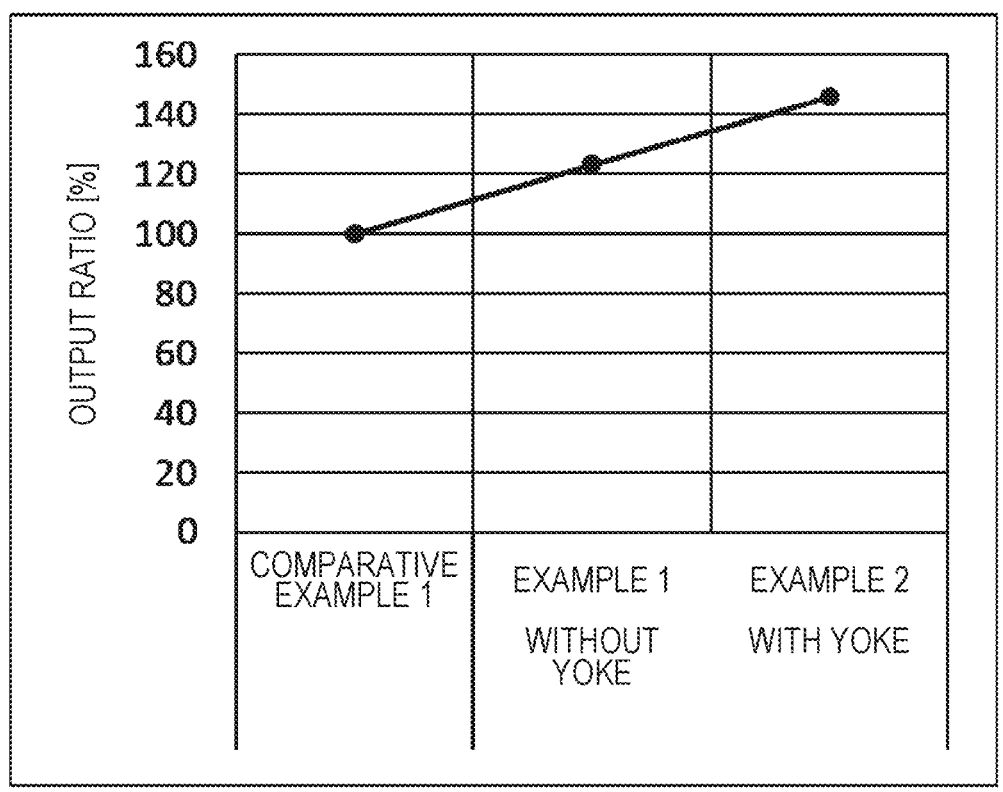
FIG. 13 is a graph showing the ratios of outputs in Examples 1 and 2 to an output in Comparative Example 1.

As illustrated in Table 1 and FIG. 13, the configuration in which the coin-type battery transmits a magnetic field from the magnetic object and the magnetic sensors detect an emission magnetic field emitted from the outer edge of the coin-type battery allows a remarkable reduction in volume and weight as compared with the related-art configuration, and also achieves improved detection accuracy due to higher output.

The present invention is applicable to a tire wear measuring device capable of measuring a wear state of a tire without visual observation.

What is claimed is:

1. A tire wear measuring device for detecting wear of a tire based on a magnetic field from a magnet embedded in a tread portion of the tire, the device comprising:
   at least one magnetic sensor;
   a magnetic collecting member which is a coin-type battery disposed above an inner surface of the tire and being capable of transmitting the magnetic field from the magnet, the magnetic collecting member having an electrode surface and an outer peripheral edge from which the magnetic field from the magnet is emitted as an emission magnetic field; and
   a magnetic-field guiding member capable of guiding the emission magnetic field,
   wherein the at least one magnetic sensor is disposed in such a position that the emission magnetic field is detected by the at least one magnetic sensor,
   wherein, in plan view from a normal direction normal to the electrode surface, the magnetic-field guiding member has an end portion disposed outside the outer peripheral edge of the coin-type battery and adjacent to the at least one magnetic sensor,
   and wherein the at least one magnetic sensor is disposed between the coin-type battery and the end portion of the magnetic-field guiding member.

2. The tire wear measuring device according to claim 1, wherein the coin-type battery is disposed such that the electrode surface faces toward the magnet.

3. The tire wear measuring device according to claim 1, wherein the magnetic-field guiding member is an antenna that serves as a waveguide and that emits and receives electromagnetic waves.

4. The tire wear measuring device according to claim 1, wherein the at least one magnetic sensor is configured to detect the emission magnetic field in a direction parallel to the electrode surface of the coin-type battery, and wherein the end portion of the magnetic-field guiding member and the at least one magnetic sensor are arranged in a same plane parallel to the electrode surface of the coin-type battery.

5. The tire wear measuring device according to claim 1, wherein the at least one magnetic sensor includes:
   a first sensor disposed on one side of the coin-type battery in a first direction parallel to the electrode surface of the coin-type battery; and
   a second sensor disposed on another side of the coin-type battery in the first direction, and
   wherein the tire wear measuring device is configured to detect wear of the tire based on an output of the first sensor and an output of the second sensor.

6. The tire wear measuring device according to claim 5, wherein, in plan view from the normal direction, the electrode surface of the coin-type battery has a center located on the magnet and aligned with the first and second sensors such that the center is disposed on a straight line connecting the first sensor and the second sensor.

7. The tire wear measuring device according to claim 1, wherein the at least one magnetic sensor includes a first sensor and a second sensor,
   wherein the magnetic-field guiding member has a first end portion and a second end portion which are disposed adjacent to the first sensor and the second sensor respectively;
   wherein the first sensor and the first end portion are disposed on one side of the coin-type battery in a first direction parallel to the electrode surface, and the second sensor and the second end portion are disposed on another side of the coin-type battery in the first direction, and
   wherein the tire wear measuring device is configured to detect wear of the tire based on an output of the first sensor and an output of the second sensor.

8. The tire wear measuring device according to claim 1, further comprising:
   a coil disposed within a range of the magnetic field from the magnet,
   wherein the tire wear measuring device is configured to operate with an induction current generated in the coil due to rotation of the tire as a power source.

9. The tire wear measuring device according to claim 8, wherein the coil is disposed between the magnetic collecting member and the magnet.

10. A power generating device comprising:
    a magnet embedded in a tread portion of a tire;
    a magnetic collecting member which is a coin-type battery disposed above an inner surface of the tire and being capable of transmitting the magnetic field from the magnet, the coin-type battery having an electrode surface and an outer peripheral edge from which the magnetic field from the magnet is emitted as an emission magnetic field;
    a coil disposed within a range of the emission magnetic field, a relative positional relationship between the magnet and the coil changing in a direction normal to an inner surface of the tire due to deformation or vibration of the tire as the tire rotates; and
    a magnetic-field guiding member capable of guiding the emission magnetic field, the magnetic-field guiding member having an end portion disposed outside the outer peripheral edge of the coin-type battery and adjacent to the coil in plan view from a normal direction normal to the electrode surface,
    wherein the coil is disposed between the coin-type battery and the magnet,
    and wherein power is generated due to a change in density of a magnetic flux passing through the coil caused by a change in the relative positional relationship.

11. The power generating device according to claim 10, further comprising:
    a magnetic member,
    wherein the coil is disposed between the magnetic member and the magnet.

* * * * *